(12) United States Patent
Righele et al.

(10) Patent No.: US 9,930,895 B2
(45) Date of Patent: Apr. 3, 2018

(54) APPARATUS FOR PREPARATION OF A FOOD PRODUCT

(71) Applicant: Risco S.p.A., Thiene (Vicenza) (IT)

(72) Inventors: Giampietro Righele, Thiene (IT); Filippo Toniello, Thiene (IT)

(73) Assignee: RISCO S.P.A., Thiene (Vicenza) (IT)

( * ) Notice: Subject to any disclaimer, the term of this patent is extended or adjusted under 35 U.S.C. 154(b) by 0 days.

(21) Appl. No.: 15/487,249

(22) Filed: Apr. 13, 2017

(65) Prior Publication Data
US 2017/0295806 A1     Oct. 19, 2017

(30) Foreign Application Priority Data
Apr. 19, 2016   (IT) .......................... 102016000040320

(51) Int. Cl.
*A22C 11/02*   (2006.01)
*A22C 11/10*   (2006.01)

(52) U.S. Cl.
CPC ...... *A22C 11/0209* (2013.01); *A22C 11/0263* (2013.01); *A22C 11/10* (2013.01)

(58) Field of Classification Search
CPC ....... A22C 11/00; A22C 11/001; A22C 11/02; A22C 11/0219; A22C 11/0218
USPC ......................................................... 452/35
See application file for complete search history.

(56) References Cited

U.S. PATENT DOCUMENTS

| | | | | |
|---|---|---|---|---|
| 2,854,689 A * | 10/1958 | Hans | ...................... | A22C 11/02 452/35 |
| 4,142,273 A * | 3/1979 | Gay | ................... | A22C 11/0218 452/36 |
| 4,991,260 A * | 2/1991 | Nausedas | ........... | A22C 11/0218 452/35 |
| 7,666,071 B2 * | 2/2010 | Nakamura | ......... | A22C 11/0218 452/36 |
| 8,137,167 B2 * | 3/2012 | Baechtle | ............ | A22C 11/0218 452/36 |

* cited by examiner

*Primary Examiner* — Richard T Price, Jr.
(74) *Attorney, Agent, or Firm* — Steinfl + Bruno LLP

(57) ABSTRACT

A twisting apparatus comprising a loading device intended to load a food product into a casing, and a braking device, is described. The loading device comprises two tubular filling bodies, or filling tubes, intended to support the casing and a twisting device intended to rotate each filling tube about its axis, and a movable frame or carriage able to support the loading device. The twisting apparatus includes a rotation unit intended to cause rotation of the loading device and angularly displace the two tubular filling bodies with respect to the braking device. Also provided is a displacement drive member connected to said movable frame or carriage so as to move with an approaching and separating displacement, or to-and-fro movement, the two tubular filling bodies away from and towards the braking device. The rotation unit includes a rotation drive member fixed to said movable frame or carriage and is able to be moved by said displacement drive member together with the loading device. The displacement drive member is also configured to move the loading device with respect to an entry member for supplying the product.

19 Claims, 7 Drawing Sheets

APPARATUS FOR PREPARATION OF A FOOD PRODUCT

CROSS REFERENCE TO RELATED APPLICATIONS

The present application claims priority to Italian patent application 102016000040320 filed on Apr. 19, 2016, the contents of which are incorporated herein by reference in their entirety.

FIELD

The present disclosure relates in general to the sector of machines or apparatuses for preparation of a sausage food product with a paste-like consistency, such as minced meat, an emulsified product, a charcuterie product or a similar product. More particularly, it relates to machines or an apparatus intended, for example, to perform twisting of a gut casing which contains the food product, in order to obtain portioning of the food product.

Even more particularly, the present disclosure relates to an apparatus which forms part of a so-called filling machine and includes, on one side, or upstream side, a supply device and, on the other side, or downstream side, a twisting device. The supply device performs supplying of the product towards the twisting apparatus so as to allow then, downstream of the twisting apparatus, any further processing or treatment of the food product already portioned and filled inside the casing.

The apparatus also comprises a loading device and a braking device. The loading device includes a pair of filling tubes or ducts, Each filling tube has a free end onto which a casing is positioned, so that the food product may be filled inside the casing. After positioning of the casing, the free end of the filling tube is able to be connected to the braking device which retains the casing and keeps it in a tensioned condition so as to allow loading or filling of food product in order to form a sausage product. At regular intervals a twisting device causes rotation of the filling tube about its axis, so as to cause twisting of the casing (kept immobile by the braking device) and division of the sausage food product into segments or parts.

The twisting apparatus further comprises a rotation unit which allows rotation of the entire loading device and in particular of the two filling tubes together. Basically, the two filling tubes are mounted on a wheel body, or rotating disc, which is rotated and alternately positions either one of the filling tubes opposite the braking device.

Consequently, during a first product loading step, one of the two filling tubes provided with the casing is associated with the braking device. In this condition, the twisting device is operated at regular intervals so as to perform regular tightening of the casing and suitable portioning of the product. When the casing has been used up, the entire loading device is rotated so as to position the other filling tube provided with a respective new casing opposite the braking device. In this condition, the first filling tube is free and may be loading with the casing. At the end of the product filling step, the procedure is repeated so as to load the product inside the tube provided with the casing and position a new casing on the other tube.

It should be noted that, at the end of loading of the food product inside the casing, a supply duct is retracted so as to release the free end of the filling tube from the braking device and therefore allow rotation of the entire rotation unit. For this purpose, the supply duct has a telescopic structure.

The author of the present disclosure has noticed that an apparatus such as that known, while being advantageous from many points of view, also has a number of problems which have not been entirely solved.

These problems relate mainly to the dimensions of the apparatus and the constructional complexity due to the presence of many components which negatively affect the possibility of carefully cleaning the apparatus. Moreover, the telescopic structure of the supply duct worsens the cleaning problem since, at the moment of retraction, any food product inside the supply duct infiltrates and gets lodged between the walls of the telescopic parts which slide inside each other.

In the light of this observation, in order to overcome the aforementioned problems, an apparatus for preparation of a food product is provided. Secondary characteristics of the subject of the present disclosure are defined in the corresponding dependent claims.

In particular, according to certain aspects of the present disclosure, the apparatus for preparation of a food product is provided with a movable frame or support carriage on which the loading device is mounted and fixed and which allows the loading device, the twisting device and the rotation device to be moved together by means of a displacement.

In particular, this movable carriage is moved with a forwards and backwards displacement by means of a displacement drive member. According to the present disclosure, the movable frame or carriage is intended to support also a rotation drive member so that the rotation drive member may be displaced forwards and backwards together with the loading device.

The loading device according to the present disclosure comprises, in addition to two tubular filling bodies, or filling tubes, also two transfer ducts which are arranged upstream of the rotation unit relative to the filling tubes. One of the transfer ducts is aligned and placed in fluid communication with a filling tube, and the other of the transfer ducts is aligned and placed in fluid communication with the other filling tube. Basically, the rotation unit is located between the filling tubes and the transfer ducts which are aligned with each other in pairs.

Moreover, the apparatus comprises a supply device for supplying the food product into the loading device. More particularly, the supply device comprises an entry duct for supplying the food product into the two transfer ducts.

As mentioned, the displacement drive member is connected to said movable frame or carriage so as to move the loading device with an approaching and separating displacement or to-and-fro movement. More particularly, owing to the geometry of the parts described above, the displacement member is able to move the loading device with respect to the entry duct of the supply device. Even more particularly, the loading device is moved by said displacement drive member between a position for supplying the food product and a free position or non-supplying position.

In the supplying position one of the said two transfer ducts is in fluid communication with said entry duct so as to allow transfer of food product from said entry duct into one of said tubular filling bodies or filling tubes.

In the free position said two tubular filling bodies or filling tubes are spaced from the braking device so as to allow rotation of the unit.

In the free position, moreover, at least one of said two transfer ducts closes or interrupts fluid communication with said entry duct.

Basically, according to the present disclosure, an apparatus is provided where a same displacement unit allows the loading device to be moved together with the rotation device or unit and, at the same time, owing to the presence of the transfer ducts, closing or opening of the fluid communication with the entry duct (the entry duct is closed with respect to the displacement member and the movable frame).

Owing to the fact that the rotation drive member and the transfer ducts with the filling tubes are mounted on the movable frame, it is possible to obtain a compact apparatus which is also very easy to clean compared to an apparatus of the prior art.

Preferably, the apparatus comprises a housing able to accommodate with play said transfer ducts. The housing may rotate with respect to said entry duct together with said transfer ducts and is stationary or not movable during said approaching or separating displacement or to-and-fro movement. Basically, the housing is able to contain the transfer ducts and collect any product residue which might spill out of the openings/mouths connecting together the transfer ducts and the entry duct.

Preferably, in order to limit the spaces and the dimensions of the entire apparatus, the housing defines a cavity inside which said entry duct of the supply device is arranged. In other words, the entry duct is located in a hollow zone or niche which is formed between two portions or wings of the housing.

Preferably, the housing has a guiding and accompanying function for the to-and-fro and rotational movement of the transfer ducts. In particular, the housing includes two guide seats each able to receive a corresponding transfer duct so as to allow guided sliding of said transfer ducts. For example, in order to obtain this accompanying and guiding action, the entry duct of the supply device includes a circular coupling element able to be coupled with a coupling counter-element of the housing. The coupling element and said coupling counter-element allow rotation of the housing with respect to the transfer duct and prevent a displacement of the housing with respect to the transfer duct.

Preferably, in order to obtain optimization of the spaces, the entry duct is also located in an intermediate position between said two transfer ducts.

Preferably, the transfer ducts and the filling tubes or ducts, when in operation, are arranged substantially parallel to an axis for loading the food product and parallel to an axis of rotation of the rotation unit. The entry duct is located in a position centered or aligned with the axis of rotation of the rotation unit. In this way, the entire movable frame moves along an axis parallel to the axis of rotation. This geometric arrangement allows further optimization of the spaces inside the entire apparatus. In accordance with this embodiment, each of the transfer ducts and the entry duct has a channel with curvature leading into a respective connection mouth in a side wall.

Further advantages, characteristic features and modes of use forming the subject of the present disclosure will become clear from the following detailed description of a number of examples of embodiment thereof, provided by way of a non-limiting example. It is evident, however, that each example of embodiment may have one or more of the advantages listed above; in any case it is not required that each embodiment should have simultaneously all the advantages listed.

BRIEF DESCRIPTION OF THE DRAWINGS

Reference will be made to the figures of the accompanying drawings in which.

Figure 1:
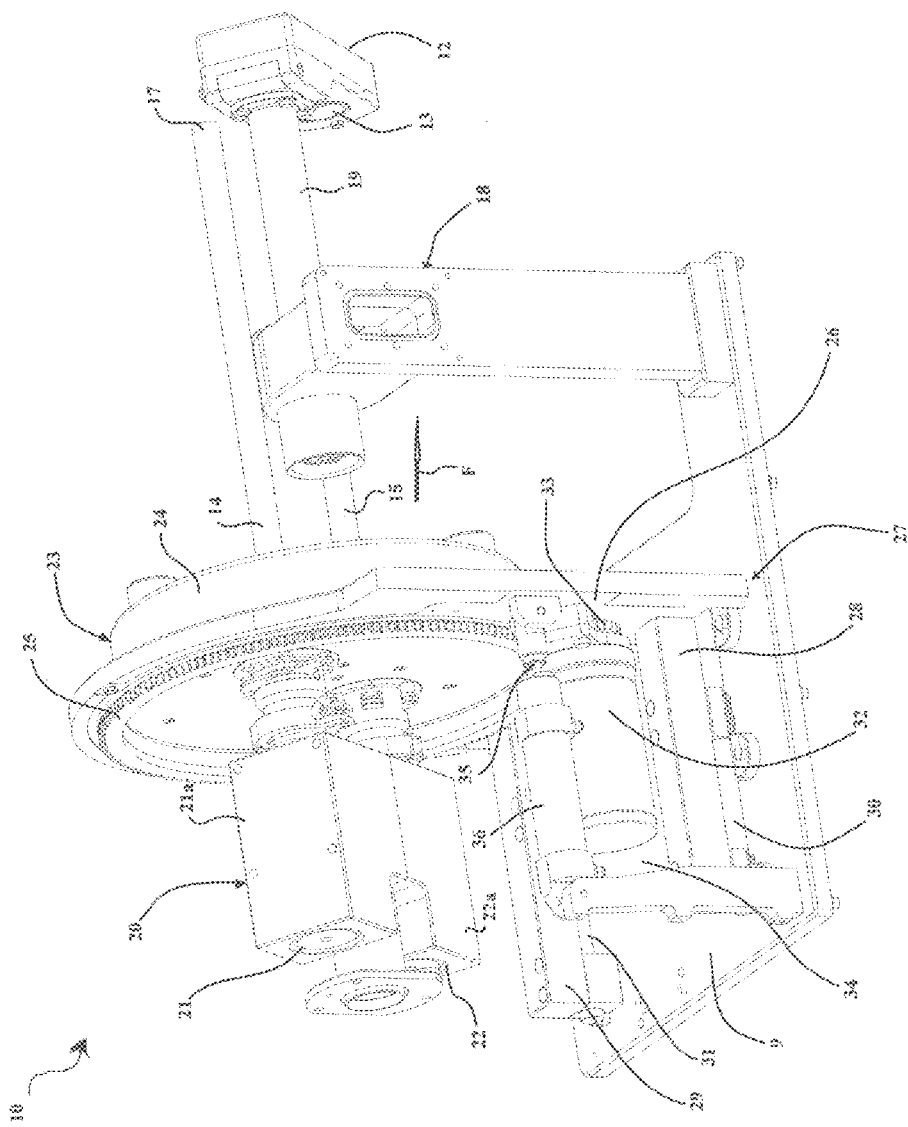
FIG. 1 shows an axonometric view of a twisting apparatus according to an embodiment of the present disclosure during a first operating step.
Figure 2:
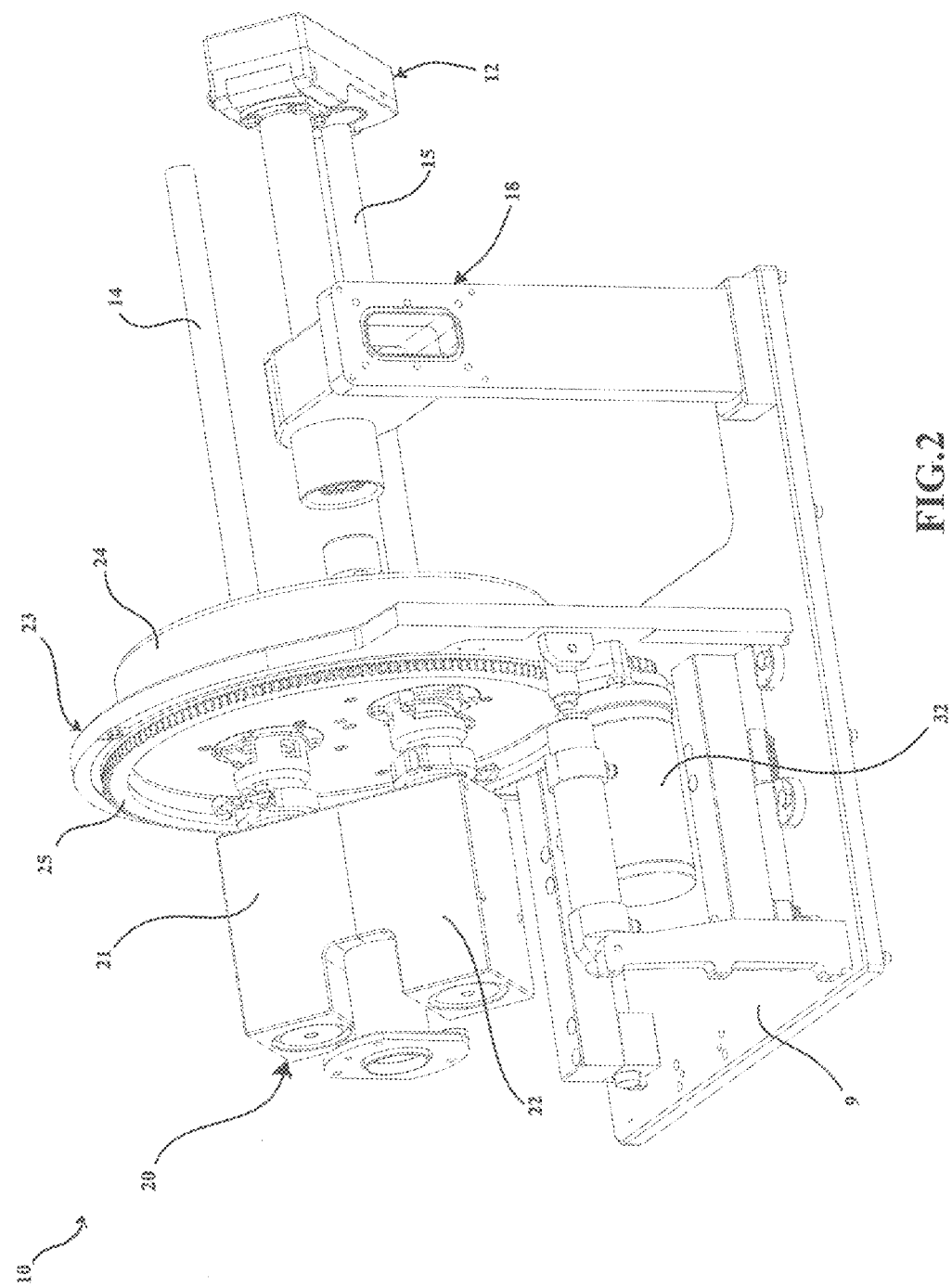
FIG. 2 shows an axonometric view of a twisting apparatus according to an embodiment of the present disclosure during a second operating step.
Figure 3:
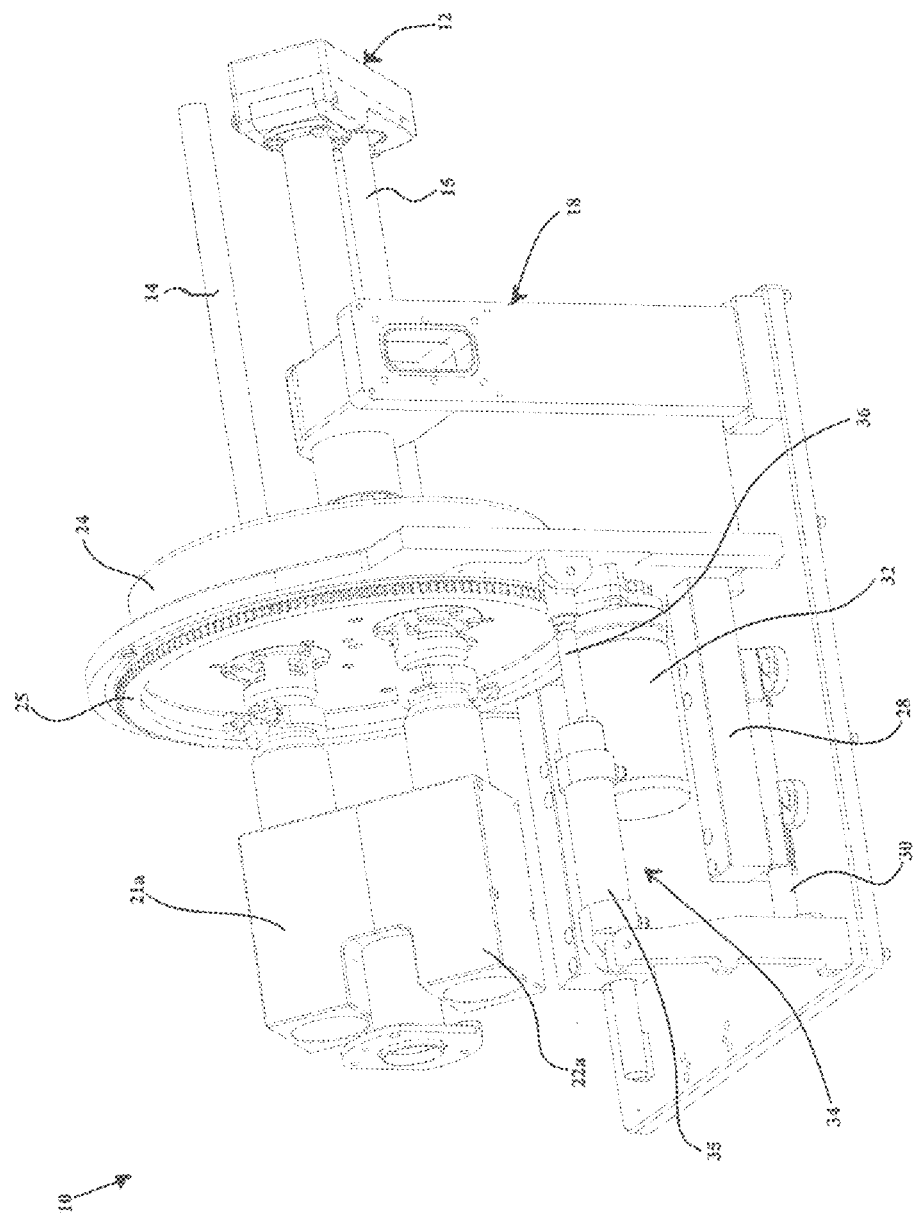
FIG. 3 shows an axonometric view of a twisting apparatus according to an embodiment of the present disclosure during a third operating step.
Figure 4:
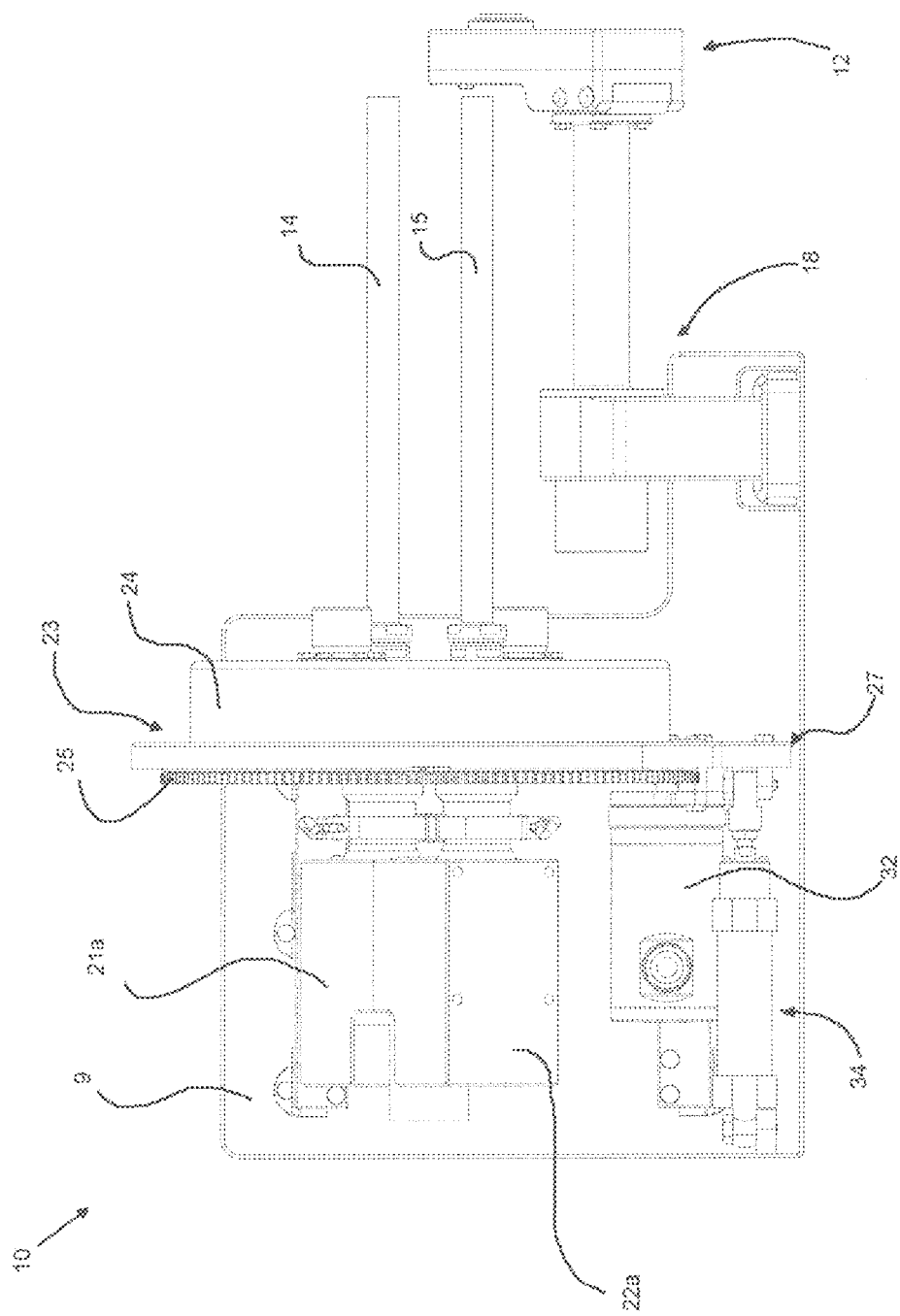
FIGS. 4 and 5 show respective top or plan views of the twisting apparatus according to FIGS. 1-3 during respective operating steps.
Figure 5:
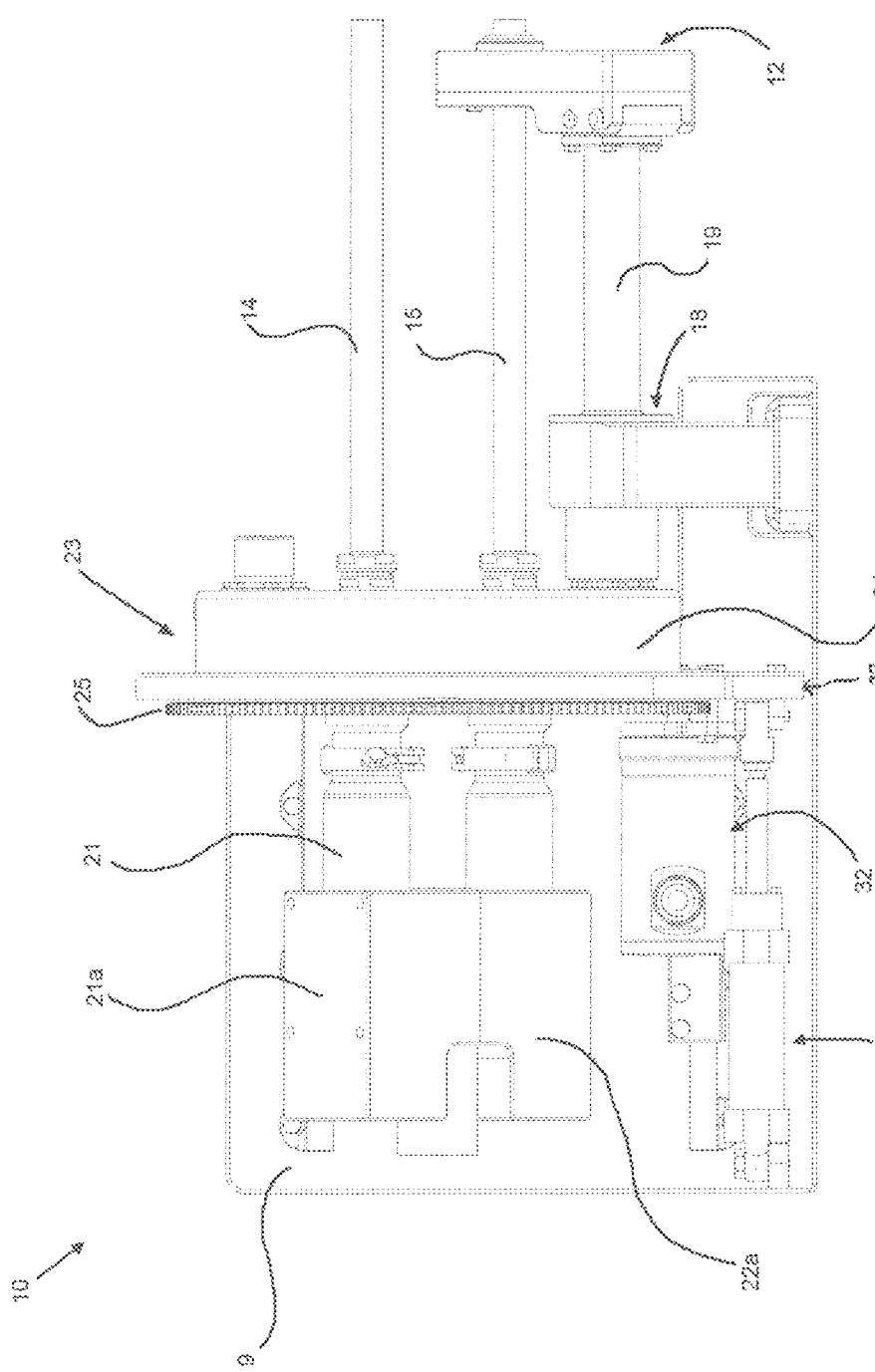
Figure 6:
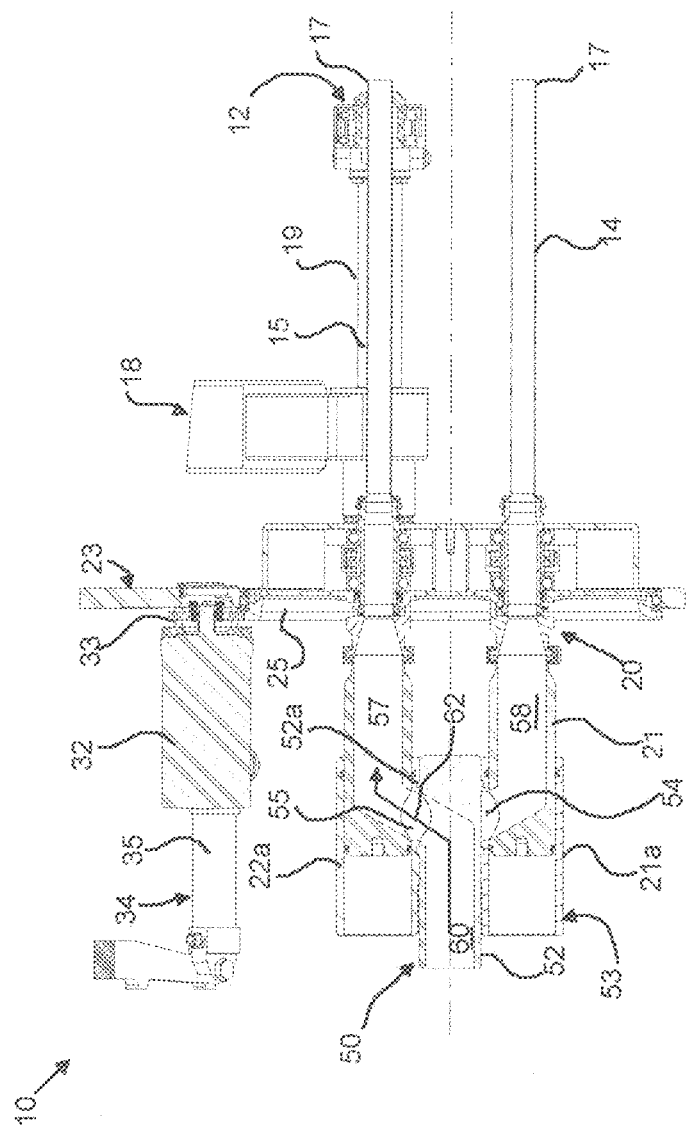
FIGS. 6 and 7 show respective top or plan views of the twisting apparatus according to FIGS. 1-3 during respective operating steps.

With reference to the attached figures, the reference number 10 indicates an apparatus according to the present disclosure for the preparation of a food product.

The apparatus 10 comprises a framework 9, or support frame, which is formed in this case by a support table.

The apparatus 10 includes a device 20 for loading a food product, mounted on the framework 9. The loading device 20 is able to load the food product inside a casing. The food product is not shown in the drawings and may be, for example, a product based on minced meat or not, or a product in the form a paste, and intended to be loaded or filled inside a gut casing or inside another casing made of soft and flexible material (also not shown in the drawings).

The apparatus 10 forms part of a filling machine not shown in the drawings. More particularly, the apparatus 10 includes, on one side, or upstream, a supply device 50 which performs supplying of the product towards the apparatus. On the other side, or downstream, the apparatus 10 is associated with a processing apparatus (not shown in the figures), where the food product, once filled inside the casing, is transferred. The processing apparatus may have any form and function and does not form part of the present disclosure.

The food product, which arrives from the filling machine and reaches the processing machine passing through the apparatus 10, defines a path for loading and feeding of the food product, having a direction of feeding of the food product. The feeding direction is indicated by the arrow F in the figures. In connection with the present disclosure, each spatial reference, such as "next to", "alongside", "upstream", "downstream", "horizontal" or "vertical", "above" or "below", "at the bottom", "retracted" or "advanced", or similar spatial references, is to be understood by way of example with reference to the apparatus 10 as arranged in the figures, when it is in operation, and is located on a bottom surface and in which the loading path and the direction of feeding of the food product may be distinguished.

The loading device 20 includes a pair of transfer ducts 21, 22, preferably inserted slidingly inside respective guide housings 21a, 22a, as will be described below, and a pair of filling tubes or ducts 14, 15. One of the transfer ducts 21 is aligned with and able to be placed in fluid communication with a filling tube 14, and the other of the transfer ducts 22 is aligned with and able to be placed in fluid communication with the other filling tube 15. The transfer ducts 21, 22 and the filling tubes or ducts 14, 15, when they are in operation, are arranged substantially parallel to a longitudinal axis, parallel at least to a section of the loading path, in order to fill the food product inside the casing. During a normal conventional operating condition, the longitudinal axis is a horizontal axis. The food product is intended to pass inside the transfer ducts 21, 22 and inside the filling ducts or tubes 14, 15.

The apparatus 10 comprises also a twisting device 18, which allows each filling tube 14, 15 to rotate about its axis, so as to allow twisting of the casing, when the casing is mounted on the free end 17 of the filling tube 14, 15. The twisting device 18 is of the type known in the sector and comprises a rotational actuating member connected by means of a belt or similar motion transmission device for transmitting a movement for transmission of the motion to the filling tube 14.

The apparatus 10 also comprises a braking device 12, of the type known to the person skilled in the art, which is connected to the loading device 20 by means of a rigid arm 19. The braking device 12 is provided with a bush, called brake, designed to keep the casing stationary and generate the necessary tension for optimum filling of the product inside the said casing. The braking device 12 is provided with an opening 13 for receiving the free end section 17 of the filling tube 14, 15.

The loading device 20 also includes a rotation unit 23 intended to rotate about the longitudinal axis and cause rotation of the two transfer ducts 21, 22 and the two filling tubes 14, 15. The rotation unit 23 is arranged in an intermediate position between the two transfer ducts 21, 22 and the two filling tubes, 14, 15, respectively.

The rotation unit 23 comprises a toothed wheel 25 and a rotating body 24, such as a disc-shaped body, rotationally integral with the toothed wheel 25. The rotating body 24 supports in a fixed manner on one side (or upstream side) the two transfer ducts 21, 22 and on the other side (or downstream side) the two filling tubes 14, 15. Basically, the two transfer ducts 21, 22 and the two filling tubes 14, 15 are integral, during movement, with the rotation unit 23, namely they rotate together.

According to a first aspect of the present disclosure, the apparatus 10 includes a movable frame or carriage 27 on which the rotation unit 23 is mounted. This movable frame includes preferably a border area 26 which surrounds the rotating or revolving body 24. The border area 26 houses the rotating body 24 inside respective guides (not visible in the drawings) provided with respective bearings for allowing rotation of the rotating body 24 and the toothed wheel 25 fixed thereto. The border area 26 therefore does not rotate together with the toothed wheel 25.

The movable frame 27 also includes preferably two slide-like bodies 28, 29, sliding blocks, cursors or similar sliding elements fixed to the base of the border area 26 on opposite sides of the rotating body 24. The slide-like bodies 28, 29 are mounted with suitable play on respective rails 30, 31 or guides fixed and mounted on the support plate 9.

The apparatus 10 comprises a rotation drive member 32 for causing rotation of the rotation unit 23, and therefore the toothed wheel 25, and therefore the entire rotating body 24. In particular, as can be seen in the drawings, the rotation drive member 32 is provided with a gearing 33 able to engage with the toothed wheel 25 and cause rotation thereof.

The rotation of the filling tubes 14 and 15 allows the casing to be loaded alternately onto each of the free ends 17 of the filling tube 14, 15 so that, when one filling tube is engaged with loading of the food product, the other filling tube is free for positioning of a new casing.

According to another aspect of the present disclosure, the assembly formed by the loading device 20 including the rotation unit 23, the transfer ducts 21, 22 and the filling tubes 14, 15 and the movable frame 27 forms a unit displaceable in a longitudinal direction forwards and backwards, i.e. forwards and backwards with respect to the direction of feeding of the food product. The forwards and backwards movement is performed also with respect to the supply device 50.

In other words, the unit composed of the aforementioned devices may be moved forwards and backwards so as to move, respectively, the filling tubes 14, 15 towards and away from the braking device 12. For this purpose, a displacement drive member 34, for example a pneumatic member comprising a piston 35 and a cylinder 36, is provided. An activation fluid is intended to be introduced into the cylinder 36. The cylinder 36 is mounted fixed on the aforementioned guides 30, 31.

The displacement drive member 34 is therefore intended to move the entire loading device 20, including the aforementioned border area 26, and also the rotation unit 23.

In particular, according to an aspect of the present disclosure, the rotation drive member 32 is mounted on or integral, during displacement, with the aforementioned movable frame 27 or movement carriage, so as to be moved forwards and backwards by means of the displacement member 34 together with the carriage 27.

For this purpose, for example, as shown in the figures, the rotation drive member 32 is fixed via suitable mechanical fixing means to the border area 26. In this way, when the displacement drive member 34 moves the loading device, the rotation drive member 32 is also moved at the same time.

The gearing 33 of the drive member 32 is constantly engaged with the toothed wheel 25 so as to be displaced together with the latter.

Moreover, the apparatus 10 comprises, as mentioned, a supply device 50 for supplying the food product into the loading device 20. More particularly, the supply device 50 comprises an entry duct for supplying the food product inside the two transfer ducts 20, 21. The aforementioned displacement drive member 34 connected to said movable frame or carriage allows the loading device 20 to be moved, with an approaching and separating displacement or to-and-fro movement, relative to both the braking device 12 and to the entry duct 52 of the supply device 50. It is pointed out that, in said supplying position, one of the said two transfer ducts is in fluid communication with said entry duct 52 so as to allow transfer of food product from said entry duct into one of said tubular filling bodies or filling tubes.

In said free position, the two tubular filling bodies or filling tubes are spaced from said braking device so as to allow rotation of the unit and at least one of said two transfer ducts is arranged so as to close off or interrupt fluid communication with said entry duct 52. As a result of this technical solution, it is possible to merge and optimize the dimensions of the whole apparatus 10 and obtain an apparatus where all the components are merged and combined as far as possible.

In fact, the rotation drive member may be located within the volume of the entire apparatus 10.

Preferably, the apparatus comprises a housing 53 (including the aforementioned guide housings 21a, 22a) able to accommodate with play said transfer ducts 21, 22. The housing 53 may rotate with respect to said entry duct 52 together with said transfer ducts 21, 22 and is stationary or not movable during said approaching and separating displacement or to-and-fro movement. The housing 53 defines a cavity inside which said entry duct 52 is arranged.

More particularly, it can be seen that the housing 53, and each of the aforementioned guide housings 21a, 22a, includes two guide seats each able to receive a corresponding transfer duct so as to allow guided sliding of said transfer ducts. For example, said entry duct 52 includes one or more circular coupling elements 52a able to be coupled with a coupling counter-element of the housing 53. The coupling element 52a and the coupling counter-element are adapted to allow a rotation of the housing with respect to the entry duct and prevent a displacement of the housing with respect to the entry duct.

Figure 7:
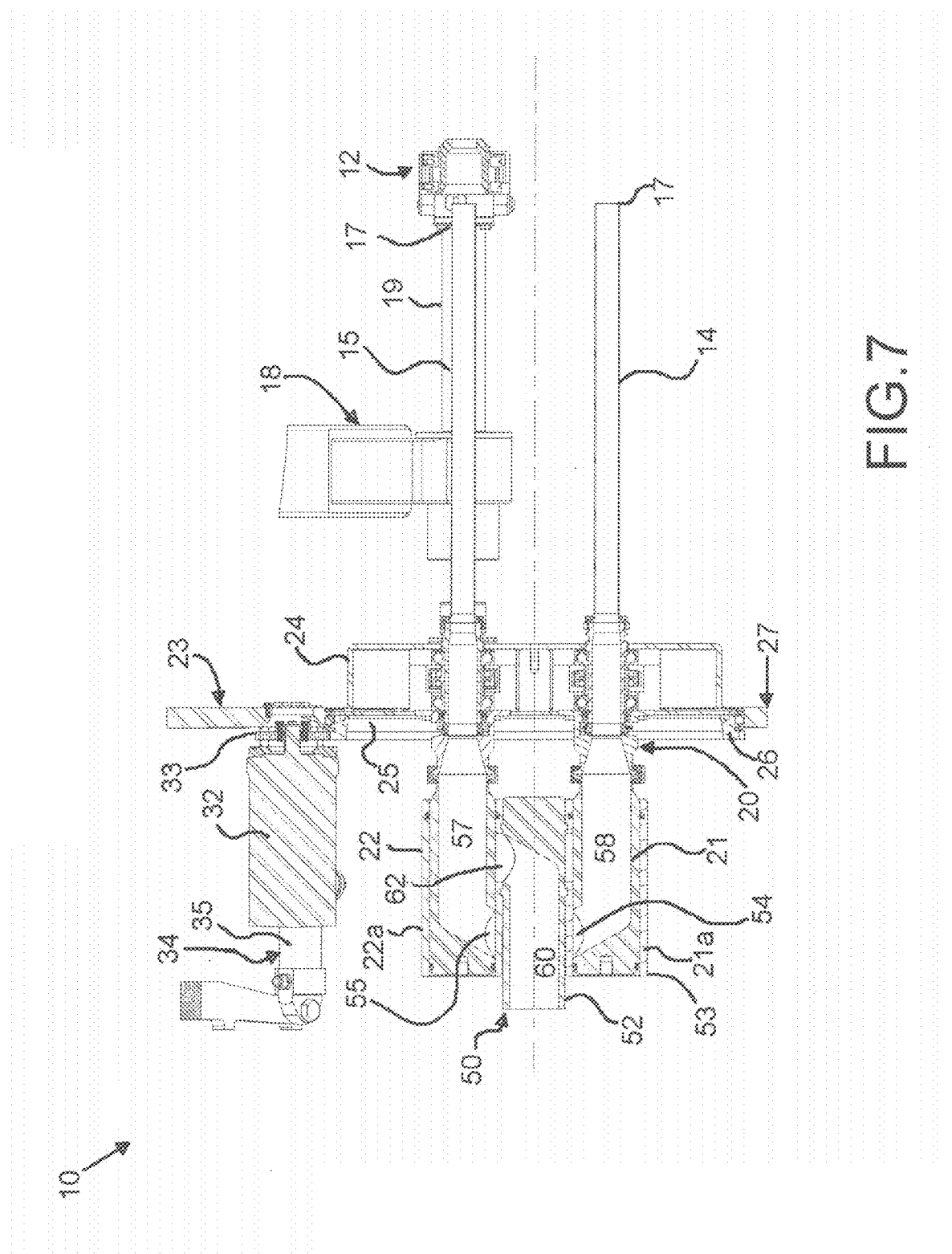

For example, it is pointed out that the entry duct 52 is located in an intermediate position between said two transfer ducts. In this way, the entire apparatus may have a very compact volume. Even more particularly, it is pointed out that preferably the assembly formed by the loading device 20, the rotation unit 23 and the movable frame 27 is an assembly displaceable in a longitudinal direction forwards and backwards with respect to the entry duct 52, wherein said direction is parallel to a central axis of rotation. To this end, and for the purposes of the geometrical layout of the parts described above, the two transfer ducts 21, 22 have an insertion opening 54, 55 which is on one side of the respective duct, namely on a side wall. The ducts are therefore provided with an internal channel 57, 58 which has a curvature, namely which deviates towards the central axis of rotation. The entry duct 52 also has an internal channel 60 which has a curvature leading into a mouth 62 offset with respect to the central axis of rotation, namely which deviates away from the central axis of rotation. It can be seen in FIG. 7 that the side walls of the two transfer ducts 21, 22 close off the mouth 62 of the entry duct.

This solution, in addition to being advantageous from the point of view of the dimensions, is advantageous also in that the reduced number of components allows easy disassembly of all the components which come into contact with the product, and cleaning of the machine which is greatly facilitated as a result.

A mode of operation of the apparatus 10 is as follows.

During a first step where the product is loaded into the transfer ducts 22, 22, the loading device 20 is in an advanced condition. In this condition, both the filling tube 14 and the filling tube 15 provided with the casing are advanced; moreover the filling tube 15 is associated with the braking device 12. In this condition the loading device 20 allows the product to pass only into the duct 21, leaving the duct 20 closed. The twisting device 18 supports an external motor which causes the rotation, at regular intervals, of both the tube inserted inside the braking device 12 and the braking device itself so as to perform regular tightening of the casing and suitable portioning of the product. In the meantime the filling tube 14 is free to be prepared, with insertion of the casing for subsequent filling.

When the casing of the filling tube 15 has been used up, the displacement drive member 34 retracts the entire loading device 20 and also the rotation drive member 32 is activated so as to release the engagement of the free end of the filling tube 15 with the braking device 12. At the same time, the transfer ducts 20 and 21 are closed off to stop transfer of the product, preventing said product from spilling out therefrom during the subsequent rotation step.

The rotation drive member 32 is then operated so as to rotate the loading device 20 and position the other filling tube 14 provided with a respective new casing opposite the braking device 12. In this condition, the first filling tube 15 may be loaded again with the casing.

At the end of the product filling step, the displacement drive member 34 is operated again in order to retract the loading device 20 and perform rotation and loading of another casing.

The subject-matter of the present disclosure has been described hitherto with reference to preferred embodiments. It is to be understood that other embodiments relating to the same inventive idea may exist, all of these falling within the scope of protection of the claims which are attached below.

The invention claimed is:

1. Apparatus for preparation of a food product, said apparatus comprising:
   a loading device intended to load a food product inside a casing,
   a braking device,
   a supply device for supplying the food product into the loading device, and
   a movable frame or carriage for supporting the loading device, wherein the loading device comprises two tubular filling bodies or filling tubes intended to support the casing, two transfer ducts and a twisting device intended to rotate each filling tube about its axis,
   wherein the supply device comprises an entry duct for supplying the food product into the two transfer ducts, wherein one of the transfer ducts is able to be aligned and placed in fluid communication with a filling tube and the other of the transfer ducts is aligned and able to be placed in fluid communication with the other filling tube, and wherein the apparatus includes
   a rotation unit intended to cause rotation of the loading device and angularly displace the loading device with respect to the braking device and
   a displacement drive member connected to said movable frame or carriage for moving the loading device with a displacement with to-and-fro movement or with an approaching and separating movement relative to the braking device and to the entry duct of the supply device, wherein the rotation unit includes a rotation drive member fixed to said movable frame or carriage and able to be moved by said displacement drive member together with the loading device between a position for supplying the food product and a free position, or non-supplying position, wherein, in said supplying position, one of said two transfer ducts is in fluid communication with said entry duct so as to allow transfer of food product from said entry duct into one of said tubular filling ducts or filling tubes and wherein, in said free position, said two tubular filing bodies or filling tubes are spaced from said braking device so as to allow a rotation of the loading device and wherein, at least in said free or non-supplying position, one of said two transfer ducts is able to close or interrupt fluid communication with said entry duct.

2. Apparatus according to claim 1, comprising a housing able to accommodate with play said transfer ducts, said housing being able to rotate with respect to said entry duct together with said transfer ducts, said housing being stationary or not movable during said displacement with to-and-fro movement, or approaching and separating movement.

3. Apparatus according to claim 2, wherein said housing defines a cavity inside which said entry duct is arranged.

4. Apparatus according to claim 2, wherein said housing includes two guide seats each able to receive a corresponding transfer duct for allowing guided sliding of said transfer ducts.

5. Apparatus according to claim 4, wherein said entry duct includes a coupling element able to be coupled with a coupling counter-element of the housing, said coupling element and said coupling counter-element being adapted to allow a rotation of the housing with respect to the entry duct and prevent a displacement of the housing with respect to the entry duct.

6. Apparatus according to claim 1, wherein the entry duct is located in an intermediate position between said two transfer ducts.

7. Apparatus according to claim 1, wherein the transfer ducts and the filling tubes or ducts, when in operation, are arranged substantially parallel to an axis for loading the food product and parallel to an axis of rotation of the rotation unit and said entry duct is located in a position centered or in alignment with the axis of rotation of the rotation unit.

8. Apparatus according to claim 1, wherein the rotation unit comprises a toothed wheel and a rotating body rotationally integral with the toothed wheel, wherein the rotating body supports in a fixed manner on one side, or upstream side, the two transfer ducts, and on the other side, or downstream side, the two filling tubes.

9. Apparatus according to claim 8, wherein the movable frame includes a border area which surrounds with play the rotating body and the toothed wheel, wherein the rotating body is able to rotate with respect to the border area.

10. Apparatus according to claim 9, wherein the rotation drive member is fixed to the border area.

11. Apparatus according to claim 8, wherein a gearing associated with a shaft of the rotation drive member is constantly engaged with the toothed wheel.

12. Apparatus according to claim 8, wherein the movable frame includes two slide-like bodies, sliding blocks, cursors or similar sliding elements fixed to the border area on opposite sides of the rotating body.

13. Apparatus according to claim 12, wherein the slide-like bodies are mounted with suitable play on respective rails or fixed guides and mounted on a support plate.

14. Apparatus according to claim 1, wherein the assembly formed by the loading device, the rotation unit and the movable frame is an assembly displaceable in a longitudinal direction forwards and backwards with respect to the entry duct, wherein said direction is parallel to an axis of rotation.

15. Apparatus according to claim 14, wherein the two transfer ducts have an insertion opening formed in a side wall of the respective duct and wherein the transfer ducts are provided with an internal channel having a curvature deviating towards the axis of rotation and wherein the entry duct has an internal channel which has a curvature leading into a mouth offset with respect to the axis of rotation and deviating away from the axis of rotation.

16. Apparatus according to claim 15, wherein the side walls of the two entry ducts are adapted to close the mouth of the entry duct.

17. Apparatus according to claim 1, wherein said displacement drive member includes a pneumatic member comprising a piston and a cylinder, wherein the cylinder is mounted fixed on a support frame.

18. Apparatus according to claim 1, wherein at least in said free position both said two transfer ducts are not in fluid communication with said entry duct.

19. Apparatus according to claim 1, wherein at least in said supplying position only one of said two transfer ducts is in fluid communication with said entry duct.

\* \* \* \* \*